(12) United States Patent
Huang et al.

(10) Patent No.: US 9,202,081 B2
(45) Date of Patent: Dec. 1, 2015

(54) APPARATUS AND METHODS FOR ANONYMIZING A DATA SET

(71) Applicant: Telefonaktiebolaget L M Ericsson (publ), Stockholm (SE)

(72) Inventors: Vincent Huang, Sollentuna (SE); Martin Svensson, Hagersten (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 346 days.

(21) Appl. No.: 13/716,910

(22) Filed: Dec. 17, 2012

(65) Prior Publication Data

US 2014/0172854 A1    Jun. 19, 2014

(51) Int. Cl.
*G06F 21/62* (2013.01)
*G06F 17/30* (2006.01)

(52) U.S. Cl.
CPC ........ *G06F 21/6245* (2013.01); *G06F 21/6254* (2013.01); *G06F 17/30598* (2013.01); *G06F 17/30604* (2013.01)

(58) Field of Classification Search
CPC .......................... G06F 21/6245; G06F 21/6254
USPC ................................................. 707/757, 737
See application file for complete search history.

(56) References Cited

U.S. PATENT DOCUMENTS

2002/0169793 A1* 11/2002 Sweeney ........................ 707/204
2013/0339359 A1* 12/2013 Goyal et al. .................... 707/737

OTHER PUBLICATIONS

Ji-Won Byun, Efficient k-Anonymization Using Clustering Techniques, 2007, Springer—Verlag Berlin Heidelberg, p. 188-200.*

* cited by examiner

*Primary Examiner* — Thu-Nguyet Le
(74) *Attorney, Agent, or Firm* — Rothwell, Figg, Ernst & Manbeck P.C.

(57) ABSTRACT

Methods and systems are disclosed for anonymizing a dataset that correlates a set of entities with respective attributes. The method may include: for each entity included in a set of entities, transforming two or more attribute values associated with the entity using received preference information, thereby creating for the entity a set of two or more transformed attribute values; clustering the entities included in the set of entities using said transformed attribute values to form at least a first entity cluster consisting of a first subset of the entities and a second entity cluster consisting of a second subset of the entities, wherein no entity included in the first entity cluster is included in the second entity cluster; anonymizing the first subset of entities; and anonymizing the second subset of entities.

16 Claims, 14 Drawing Sheets

1001

|         | Attribute A | Attribute B |
|---------|-------------|-------------|
| User 1  | 2           | 12          |
| User 2  | 3           | 17          |
| User 3  | 4           | 10          |
| User 4  | 1           | 15          |

1002

|         | Attribute A | Attribute B |
|---------|-------------|-------------|
| User 1  | 3           | 11          |
| User 2  | 2           | 16          |
| User 3  | 3           | 11          |
| User 4  | 2           | 16          |

FIG. 10

APPARATUS AND METHODS FOR ANONYMIZING A DATA SET

TECHNICAL FIELD

Embodiments relate to apparatuses and methods for anonymizing a data set.

BACKGROUND

Many service providers, including e-commerce websites, collect massive amounts of data about people, such as the people that use a service provided by service provider. Such "user data" can be mined for insights or used to create useful computer systems, such as recommendation engines. For example, e-commerce sites often track a user's shopping history and analyze it to recommend new products in which the user may be interested. Similarly, online movie streaming providers may track a user's viewing history and/or self-reported ratings to suggest additional movies that the user may be interested in viewing.

As the amount of valuable data being collected has increased, so has the demand for exchange of such information. For example, the Netflix™ online DVD rental service recently published a user dataset of 100M ratings of over 17K movies by 500K entities and offered a cash prize for new algorithms for mining that data. The release of user data to the public or among private parties is inevitable given the value and uses of such data.

Given the trend towards release of user data, user privacy has become an important concern. Users are made uncomfortable by the prospect of having so much of their personal information being shared with various, often unidentified, third parties.

Privacy preserving data publishing (PPDP) is a field of technical research that focuses on manipulating a user dataset to create greater user anonymity while still maintaining the value of the dataset. Using PPDP techniques, a data publisher might "anonymize" a dataset and release the anonymized dataset to a third party rather than the original data set. Thus, the recipient of the data may be able to use the data for meaningful data mining activities but cannot learn particularly private information about each user.

Various PPDP techniques have been developed. For example, one simple technique is to replace entities' names with anonymous identifiers (e.g., random numbers) or to remove such names altogether. Simply removing the names of the entities (e.g., users) is not enough in many cases. The resulting "anonymous" information may be correlated with other information to uniquely identify a user. For example, by knowing when a particular user has rented certain movies, it may be possible to identify that user from a movie rental company's data set.

Approaches such as K-anonymity have been used to solve this problem. K-anonymity aims to modify the database such that, for any given user record, the database contains at least K-1 records that are identical to the given user record. One method to achieve this K-anonymity is described in U.S. patent application Ser. No. 13/363,688, filed on Feb. 1, 2012 (the "'688 application"), which is incorporated by reference herein in its entirety. While this approach can effectively protect user privacy, the utility of the data may be decreased as each user record essentially represents an average person within the group of K people.

SUMMARY

In addition to the above mentioned drawback regarding using K-anonymity techniques to anonymize a dataset, for the processor of the anonymous dataset, the importance of all features of data may not always be the same. For example, the age of the users may be more important for one processor, while the personal income may be more important to another. This disclosure describes an improved K-anonymity system and method to address this situation.

A computer method is disclosed for anonymizing a dataset that associates each entity included in a set of entities with a set of two or more attribute values, each attribute value included in the set corresponding to a particular entity attribute. In some embodiments, the method may include, for each entity included in the set of entities, transforming said set of two or more attribute values associated with the entity using received preference information, thereby creating for the entity a set of two or more transformed attribute values. The method may further include clustering the entities included in the set of entities using said transformed attribute values to form at least a first entity cluster consisting of a first subset of the entities and a second entity cluster consisting of a second subset of the entities, wherein no entity included in the first entity cluster is included in the second entity cluster. The method also includes anonymizing the first subset of entities and anonymizing the second subset of entities.

In some embodiments, the preference information comprises a set attribute weights, and each attribute weight included in the set is associated with an entity attribute. In such an embodiment, the step of transforming the attribute values associated with a particular one of the entities comprises: normalizing the attribute values (e.g., adjusting the attribute values to a notionally common scale), thereby producing normalized attribute values; and for each normalized attribute value, calculating a transformed value using the normalized attribute value and the weight associated with the entity attribute with which the normalized attribute is associated. The step of calculating the transformed value may further comprise multiplying the weight with a value that is equal to the normalized value minus a first value and adding the result of the multiplication with the first value. The first value may be the mean of a set of values.

In some embodiments, the step of anonymizing the first subset of entities comprises creating a first new anonymous dataset that: (1) associates a first common attribute value with each entity included the first subset, the first common attribute value being associated with a first entity attribute and (2) associates a second common attribute value with each entity included the first subset, the second common attribute value being associated with a second entity attribute that is different than the first entity attribute, and the step of anonymizing the second subset of entities comprises creating a second new anonymous dataset that: (1) associates a third common attribute value with each entity included the second subset, the third common attribute value being associated with the first entity attribute and (2) associates a fourth common attribute value with each entity included the second subset, the fourth common attribute value being associated with the second entity attribute. The method may further include publishing the first and second new anonymous datasets.

In some embodiments, the step of clustering the entities comprises: creating an intermediate dataset using the transformed attribute values and processing the intermediate dataset to create an unsparse dataset that is less sparse than the intermediate dataset; and identifying entity clusters using the unsparse dataset.

In another aspect, this disclosure provides a database anonymizing apparatus. In some embodiments the apparatus includes a data processing system and a data storage system.

The data storage system stores a dataset that associates each entity included in a set of entities with a set of two or more attribute values, wherein each said attribute value associated with the entity is associated with a different entity attribute. The data storage system includes a computer readable medium storing computer readable program code (CRPC). The CRPC comprises: instructions for, for each entity included in the set of entities, transforming said set of two or more attribute values associated with the entity using received preference information, thereby creating for the entity a set of two or more transformed attribute values; instructions for clustering the entities included in the set of entities using said transformed attribute values to form at least a first entity cluster consisting of a first subset of the entities and a second entity cluster consisting of a second subset of the entities, wherein no entity included in the first entity cluster is included in the second entity cluster; instructions for anonymizing the first subset of entities; and instructions for anonymizing the second subset of entities.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIG. 10 illustrates the process of feature extraction, according to some embodiments.

DETAILED DESCRIPTION

It is often desirable to anonymize information in a dataset before it is released. For example, users may be uncomfortable when their personally identifiable information (e.g., preferences, personal attributes, etc.) are included in a dataset that is released to a third party. To avoid violating user privacy, a dataset may be preprocessed with a k-anonymity algorithm that ensures that every user in the dataset is indistinguishable from at least k−1 other users.

Consider an example of a movie preferences dataset. The dataset may include information on a plurality of users and movie preferences for each user. Before the dataset is released to a third party, the dataset owner may anonymize the dataset by performing a k-anonymity algorithm that modifies each user's preferences such that the user's preferences are identical to those of at least k−1 other users. Thus, a third party that receives the processed dataset may not be able to learn a particular user's personal preferences but may still be able to mine the dataset for valuable insights.

As mentioned in the summary, the importance of all features of data may not always be the same for all such third party data processors. For example, the age of the users may be more important for one third party, while the personal income may be more important to another. This disclosure describes an improved K-anonymity system and method to address this situation. A great advantage of the embodiments disclosed here are they provide greater customization of the anonymous dataset.

Although many of the embodiments described herein concern datasets of user preferences, one skilled in the art given the benefit of this disclosure will recognize that the techniques described herein are generally applicable to any dataset that describes entities (e.g., users) and attributes (e.g., preferences) of those entities. It is intended that the claims of this disclosure be understood to encompass all such entity/attribute datasets.

One category of k-anonymity algorithms is clustering-based k-anonymity (hereinafter "k-clustering"). In k-clustering approaches, the database is first partitioned into "clusters" of similar users, where each cluster has at least k users. A cluster of users is similar because the members of the cluster have similar attributes (e.g., preferences). Once the users are decomposed into clusters, the attributes of each user is anonymized with respect to the attributes of all other users in the cluster. For example, each user in a given cluster may be assigned the same attributes as every other (e.g., same values for one or more attributes). The process of assigning a cluster of users the same attributes may be referred to herein generally as "feature extraction."

Figure 1:
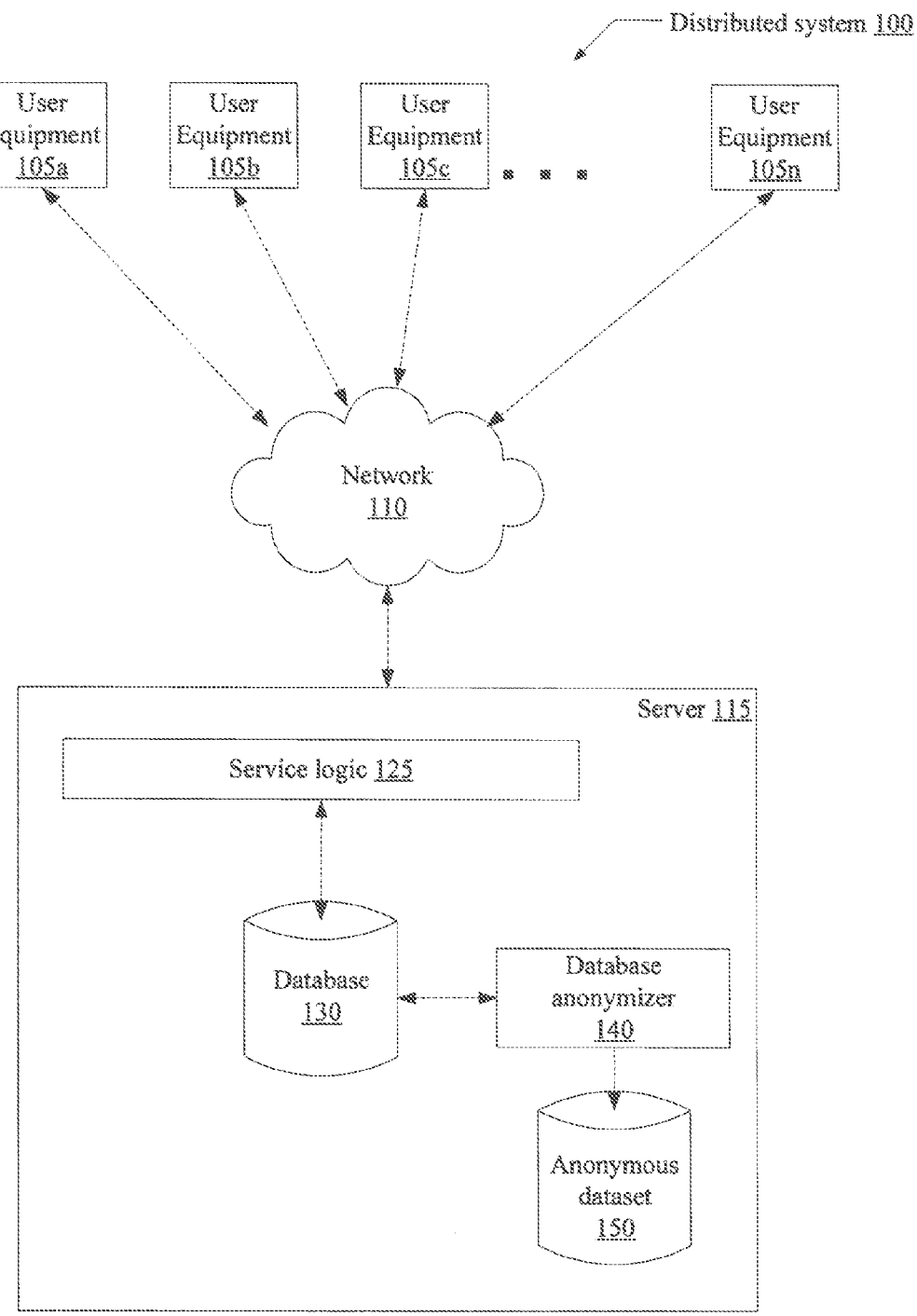
FIG. 1 is a system diagram illustrating a client/server system for gathering and anonymizing user data, according to some embodiments.

FIG. 1 is a system diagram illustrating a client/server system for gathering and anonymizing user data, according to some embodiments. In FIG. 1, distributed system 100 comprises multiple user equipment 105a-105n in communication with a server 115 over a network 110.

In various embodiments, network 110 may correspond to any one or more communication networks. Network 110 may therefore include any radio network, packet switched network (e.g., Internet, local Ethernet, etc.), local interconnect, or any other communication network capable of carrying messages from user equipment 105 to server 115.

In various embodiments, user equipment 105 may communicate attributes (e.g., user preferences) for a particular user or a particular set of users to server 115. Each user equipment 105 may correspond to one or more different machines (e.g., personal computer, mobile device, etc.), which may represent one or more different user accounts, or any other entity for which attributes can be recorded. For example, each user equipment 105 may correspond to a video-on-demand (VOD) account associated with a given user.

Server 115 includes service logic 125 for receiving user attributes from user equipment 105. For example, for a VOD service, user equipment 105 may communicate one or more users' movie ratings or other video preferences to server 115.

Server 115 utilizes service logic 125 to receive user attributes (e.g., preferences) and to record them in database 130. Database 130 may be implemented using any database technology, such as relational database, flat file(s), hierarchical database, and/or other formats.

According to the illustrated embodiment, distributed system 100 includes database anonymizer 140. Anonymizer 140 may be implemented in software and/or hardware and be configured to perform dataset anonymization techniques, as described herein. For example, database anonymizer 140 may be configured to perform a clustering-based k-anonymity algorithm, such as method 400 of FIG. 4, to create anonymous dataset 150. Anonymous dataset 150 may be stored in persistent storage, in memory, on another machine, in any other location where it may be transmitted to and/or otherwise shared with third parties.

Although service logic 125, database 130, anonymizer 140, and dataset 150 are all illustrated as being part of server 115, it should be recognized that, in various embodiments, any of these components may be implemented on a separate physical and/or virtual computers. Furthermore, any individual component (e.g., anonymizer 140), may be implemented on separate physical and/or virtual machines such that various methods described herein may be implemented collaboratively (e.g., by a cluster, by a distributed system, etc.). In such embodiments, the separate computers may be connected to one another using one or more networks to facilitate communication and collaboration.

Figure 2:
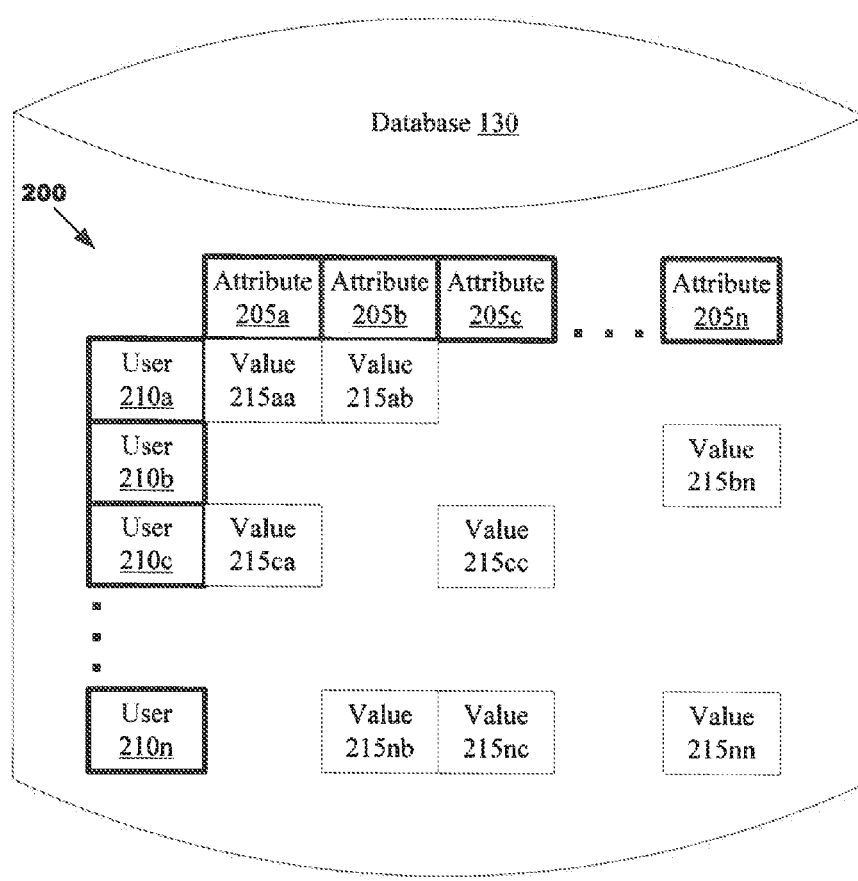
FIG. 2 is a block diagram illustrating data stored in a user attribute database, according to some embodiments.

FIG. 2 is a block diagram illustrating a dataset 200 stored in a database, according to some embodiments. Database 130 of FIG. 2 may correspond to database 130 of FIG. 1.

According to the illustrated embodiment, dataset 200 is in the form of a matrix of user attribute values. In the specific example shown, dataset 200 is a sparsely populated matrix. The dataset 200 is illustrated as a collection of records (horizontal rows), each corresponding to a respective user (e.g., user accounts on user equipment 105a-105n of FIG. 1). Each user record may include a user identifier field (see fields 210a, 210b, 210c, ..., 210n) and one or more other fields for storing values for various attributes (represented as vertical columns) (see fields 205a, 205b, 205c, ..., 205n). For example, in a movie preferences database, the database may have a row for each subscriber (user) and a column for each movie (attribute). In such a database, a value in row x and column y (value$_{xy}$) may indicate user x has rated movie y with value$_{xy}$.

Although dataset 200 is illustrated in terms of users and attributes, it should be recognized that the techniques described herein are appropriate for any dataset of entity/attribute pairings. Moreover, the dataset need not be limited to only two dimensions. In various embodiments, dataset 200 may store data in any number of dimensions (e.g., n-tuples).

Because the high-dimensionality of user preference databases makes k-clustering algorithms slow, in some embodiments, a sparse database may be processed to produce a denser, lower-dimensionality dataset. Then, a k-clustering algorithm may be performed on the lower-dimensionality dataset to anonymize the database. For example, in some embodiments, the preprocessing may include performing a singular-value decomposition on the data, which may be filtered (e.g., factor the data matrix into a diagonal matrix of singular values, set the singular values in descending order, and choose the r most significant singular values to include in the pre-processed data set).

Figure 3:
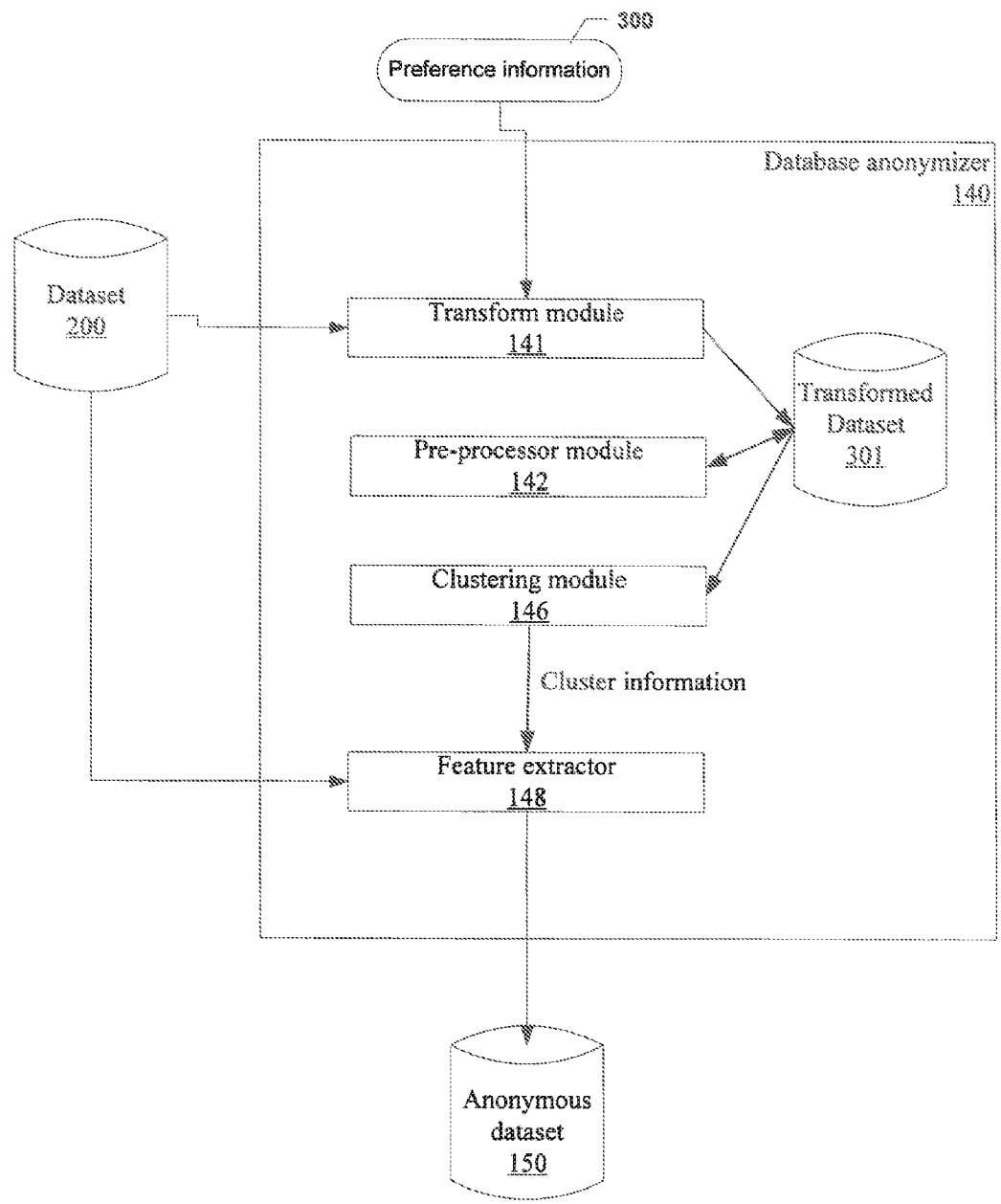
FIG. 3 is a block diagram illustrating the components of a database anonymizer according to some embodiments.

FIG. 3 is a block diagram illustrating the components of a database anonymizer 140 according to some embodiments. In some embodiments, database anonymizer 140 of FIG. 3 may correspond to anonymizer 140 of FIG. 1. Accordingly, database anonymizer 140 (or anaonymizer 140 for short) takes as input data from database 130 and uses it to produce anonymous dataset 150.

In the illustrated embodiment, anonymizer 140 includes a transform module 141 for transforming dataset 200 based on the preferences 300 of a user that desires to process anonymous dataset 200. Such user preferences 300 may comprise or consists of a vector of weights, wherein each weight in the vector corresponds to a different one of the attributes 205. The anonymizer 140, in some embodiments, is configured to transform dataset 200 for the user using a weight vector specified by the user to produce transformed data set 301.

Database anonymizer 140 may also include a pre-processor 142 for reducing the sparseness of transformed dataset 301. Preprocessor 142 may be configured to reduce the sparseness by performing various pre-processing algorithms (e.g., singular-value decomposition), as described in the '688 application.

Database anonymizer 140 further includes a clustering module 146 and a feature extractor 148. Clustering module 146 is configured to perform a k-clustering algorithm on the transformed (and optionally pre-processed) dataset 301. Clustering module 146 may be configured to perform the clustering portion of the k-clustering algorithm by clustering similar database entities (e.g., users), according to various techniques described herein and in the '688 application. In some embodiments, the result of performing the k-clustering algorithm is that a plurality of clusters (i.e., sets of entities) are identified, where each cluster includes at least K entities and no entity is included in more than one cluster.

Figure 9:
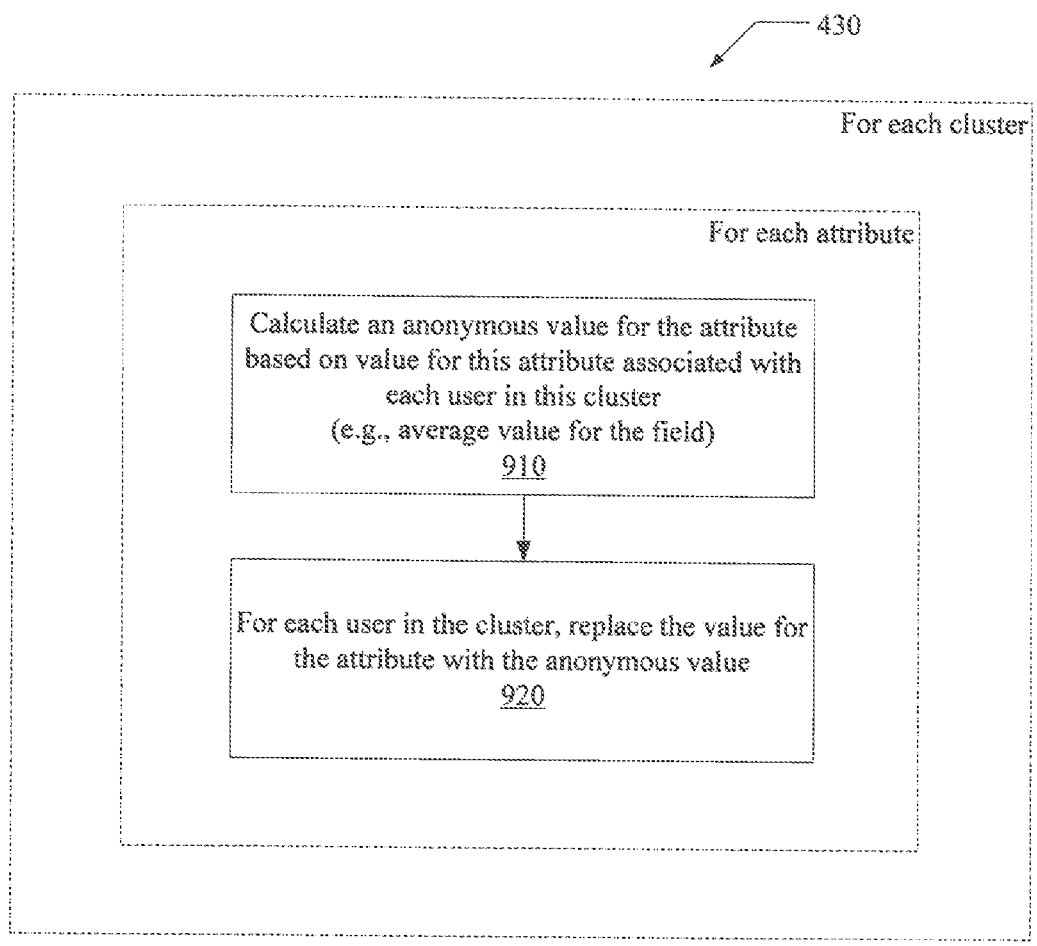
FIG. 9 is a flow diagram illustrating a method for performing feature extraction, according to some embodiments.

Feature extractor 148 may be configured to perform the feature extraction step by anonymizing the users in each cluster with respect to one another, according to various techniques described herein and in the '688 application (see e.g., the discussion of FIG. 9). That is, feature extractor 148 (i) receives clustering information from clustering module 146, which clustering information identifies each of the clusters and, for each cluster, the entities that are included in the cluster and (ii) uses the clustering information and the data from dataset 200 to produce the anonymous dataset 150. That is, it anonymizes each of the entity clusters.

Although various modules 141, 146, and 148 are illustrated separately in FIG. 3, in various embodiments, different ones of the modules may be combined or decomposed further. Any of these modules be implemented in or with the help of software, hardware, or a combination thereof.

Figure 4:
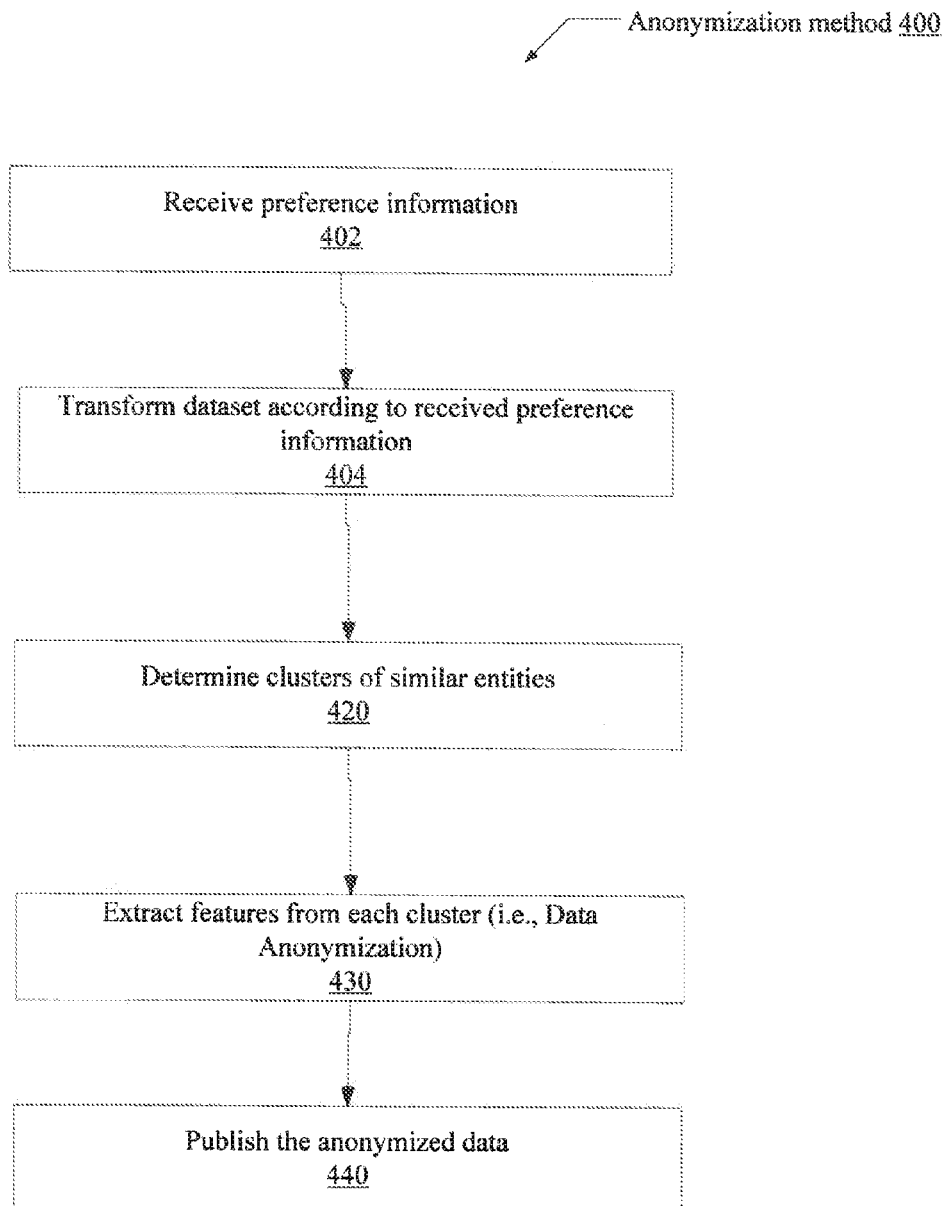
FIG. 4 is a flow diagram illustrating a method for anonymizing a data set, according to some embodiments.

FIG. 4 is a flow diagram illustrating a process 400 for anonymizing dataset 200, according to some embodiments. Process 400 may be performed by a database anonymizer, such as anonymizer 140 of FIGS. 1 and 3.

According to the illustrated embodiment, process 400 may begin with step 402, where database anonymizer 140 receives preference information 300. For example, as discussed above, the preference information 300 may comprise or consists of a weight vector—e.g. a set of weights, wherein each weight included in the set corresponds to a particular attribute 205.

Next (step 404), database anonymizer 140 transforms dataset 200 based on the preference information to produce a transformed dataset 301. For example, in step 404, database anonymizer 140, for each entity included in a set of entities (e.g., for each record of dataset 200), transforms the attribute values associated with the entity (e.g., the attribute values stored in the attribute fields of the record) using the preference information, thereby creating for the entity a set of transformed attribute values.

Next (step 420), the transformed dataset 301 is used to determine clusters of similar users. In some embodiments, after step 404 and before step 420 there may be an additional pre-processing step for reducing the sparseness of the transformed dataset 301, if desired.

Next (step 430), database anonymizer 140 performs feature extraction based on the clusters determined in step 420 and the original dataset 200, thereby producing anonymous dataset 150.

Next (step 440), the anonymous dataset 150 (or the non-duplicative portion thereof) is published or otherwise made available.

Figure 5:
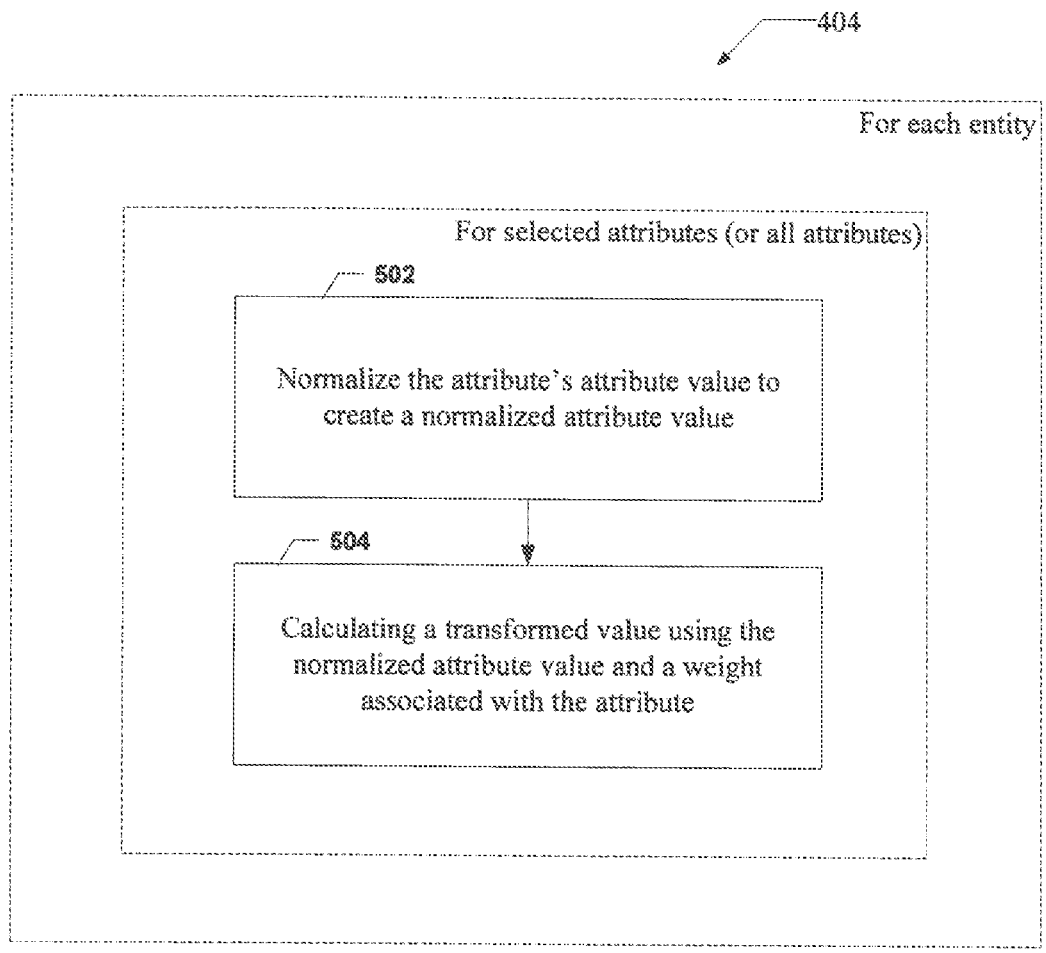
FIG. 5 is a flow diagram illustrating a method for transforming a dataset.
Figure 6:
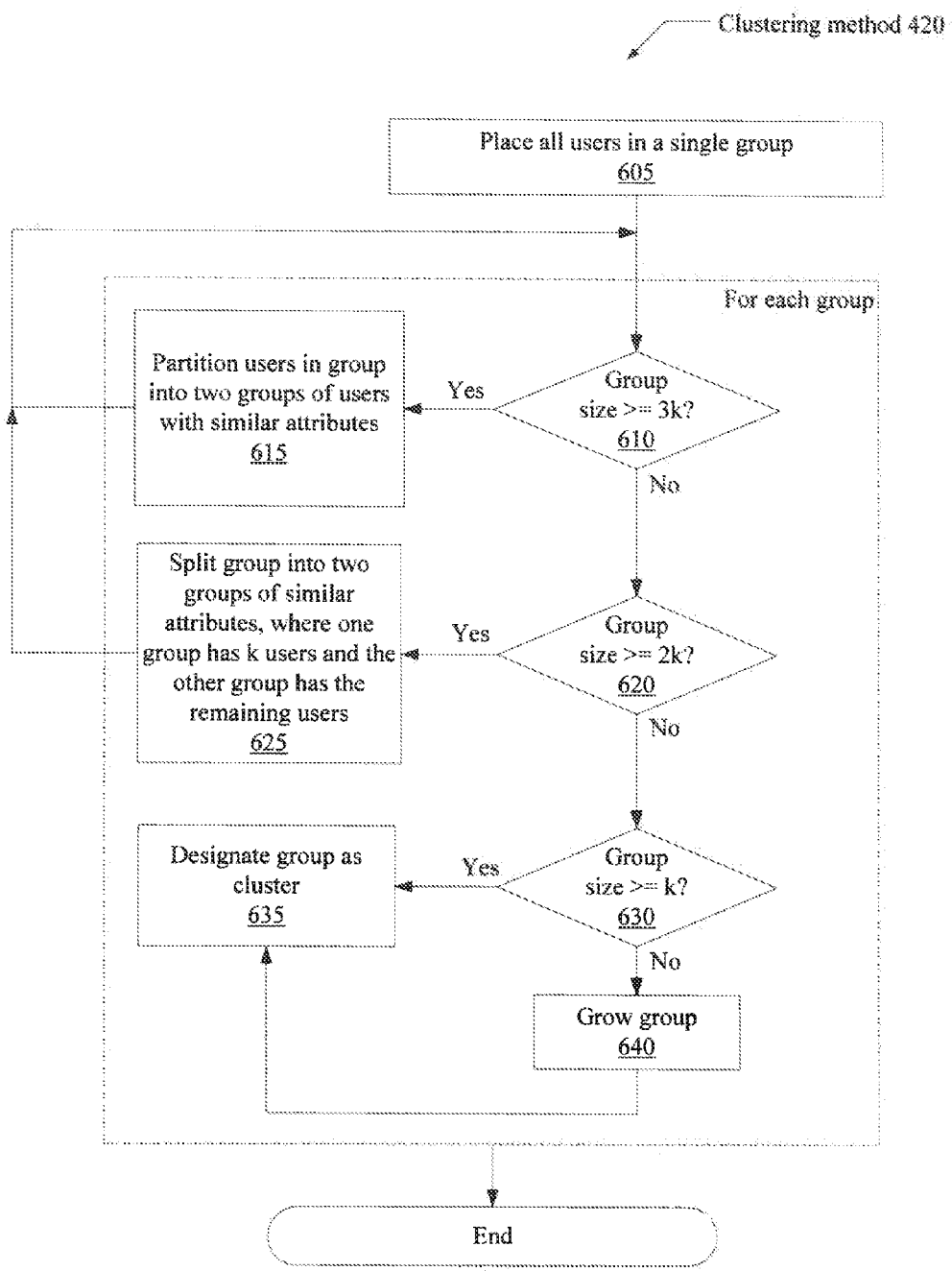
FIG. 6 is a flow diagram illustrating a method for identifying clusters of similar users, according to some embodiments.

Detailed embodiments of steps 404, 420 and 430 are presented below in relation to FIGS. 5-9. For clarity, the embodiments of FIGS. 5-9 are described in terms of a user movie preference dataset. The example input dataset is an m×n matrix A, representing m users and n movies. A value in A[i][j] represents a rating (e.g., 0-5 stars) of movie j by user i. Although the embodiments of FIGS. 5 and 6 are described in terms of a movie dataset, as noted previously, the disclosed methods apply equally to any entity/attribute dataset.

Dataset Transformation

FIG. 5 is a flow diagram illustrating a method for performing the data transformation step 404. According to the illustrated embodiment, the dataset transformation method iterates over every entity and then iterates over selected attributes (or all attributes) associated with the entity. For example, the entity may be associated with the attributes: age and income, as well as other attributes. That is, in steps 502 and 504, for each entity, for each selected attribute, obtain the attribute's value for the entity and normalize the value to create a normalized value (nv) (e.g., adjust the value to a common scale—such as the range [0,1]) and then calculate a transformed value (tv) using the normalized value (nv) and a weight (W) associated with the selected attribute. The weights associated with each of the selected attributes may be included in the preference information received in step 402. In some embodiments, step 504 is performed using the following formula: $tv_{ij}=mv_j+(nv_{ij}-mv_j)\times W_j$, where $tv_{ij}$ is the transformed value corresponding to user i and movie j, $nv_{ij}$ is the normalized value corresponding to user i and movie j, $mv_j$ is the mean of the set of attribute values corresponding to movie j, and $W_j$ is the weight value for movie j.

Clustering

In the most basic case, it is assumed that each user requires a certain fixed level of privacy. The fixed level of privacy for each user may be guaranteed by ensuring that each user is in a cluster of at least some minimum size k (i.e., at least k users in each cluster). However, to preserve the accuracy of the dataset, it may be desirable (1) that each cluster to be as small as possible without violating the condition that each cluster must have at least k users and (2) that the users in each cluster should be as similar as possible. The problem of identifying a clustering that meets all these requirements with a fixed level of privacy for every user (i.e., size of clusters) is referred to herein as the "fixed k-gather problem."

FIG. 6 is a flow diagram illustrating a method for using the selected attributes to identify clusters of similar users with fixed privacy preferences, according to some embodiments. Method 600 therefore represents a heuristic method for solving the fixed k-gather problem. Method 600 may correspond to clustering step 420 of FIG. 4 and may be performed by clustering module 146.

Method 600 begins in 605 by placing all users in the dataset into a single "group." As used herein, the term "group" refers to an intermediate grouping of one or more users; a "cluster" is a group that has reached its final membership and is ready to be anonymized via feature extraction.

Steps 610-640 of method 600 represent a recursive method that is applied to the group. Each iteration of the recursive method either bisects the group into two groups and recursively performs the method on each group, or terminates by designating the group as a "cluster." For generality, the recursive nature of the method is represented by the "for each group" idiom noted by the dashed box of FIG. 6. As such, the method of steps 610-640 is repeated on any group that has not been designated a cluster until all users in the dataset are in clusters. The illustrated embodiment is exemplary only and it is recognized that there are many variations for its particular implementation. It is intended that the claims herein cover all such variations.

In decision 610, the system decides whether the group size is greater or equal to 3k (i.e., three times the minimum group size k). If so, as indicated by the affirmative exit from 610, the method partitions the users in the group into two groups of users with similar attribute values (e.g., similar preferences), as in 615, a detailed embodiment of which is discussed below with respect to FIG. 7. The recursive method may then be applied to the two subgroups, as indicated by the feedback loop from 615 to 610. Because one of the new groups contains a subset of the original group's users and the other new group contains the rest of the original group's users, the two new groups may be considered complements.

If the group size is not greater or equal to 3k, as indicated by the negative exit from 610, the method moves to decision 620. In 620, the system decides whether the group size is greater or equal to 2k (i.e., two times the minimum group size k). If so, as indicated by the affirmative exit from 610, the method splits the group into two groups of similar preferences, as in 625, where one group has k users and the other group has the remaining users (i.e., "complement group"). Thus, the split of 625 results in two groups, one with k users and another with n users, where k<=n<2k. The recursive method may then be applied to the two newly created groups, as indicated by the feedback loop from 625 to 610.

If the group is not of size greater than or equal to 2k, as indicated by the negative exit from 620, the method moves to decision 630. In 630, the system decides whether the group size is greater than or equal to k (i.e., the minimum group size). If the group size is greater or equal to k, as indicated by the affirmative exit from 630, the group is designated as a cluster, as in 635. If the group size is not greater or equal to k, as indicated by the negative exit from 630, then the group is grown, as in 640, until the group is of size k. In 640, a group of size n can be grown by adding the k−n most similar users to the group. Once the group is grown to size k, as in 640, the group is designated a cluster, as in 635.

Method 600 ends when no more groups exist. That is, although step 635 does not include an exit, the method of 610-640 is repeated on every group (e.g., created in 615) that has not been designated as a cluster.

Figure 7:
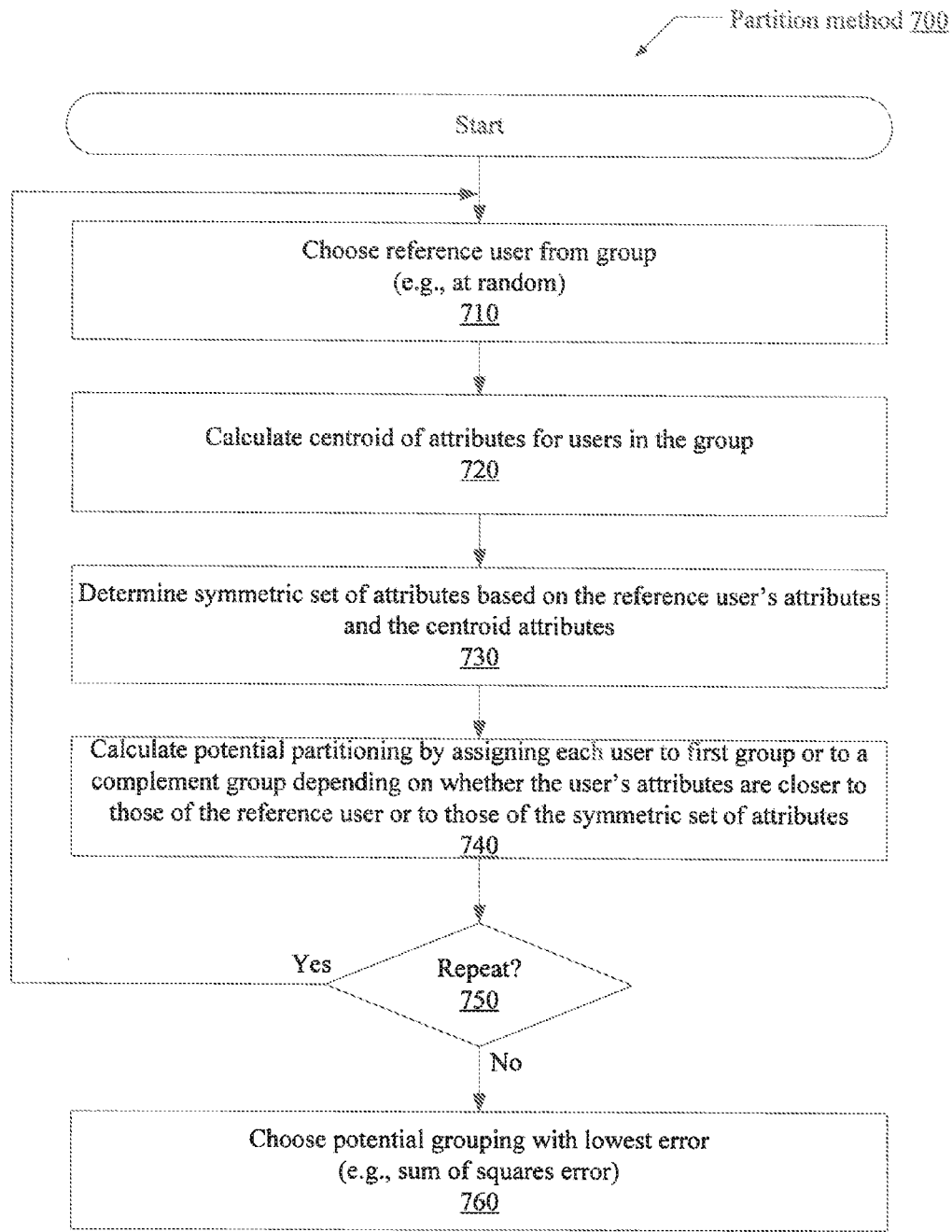
FIG. 7 is a flow diagram illustrating a method for partitioning users, according to some embodiments.

FIG. 7 is a flow diagram illustrating a method 700 for partitioning users in a group into two groups of users with similar attributes, according to some embodiments. Method 700 may correspond to a detailed embodiment of step 615 of method 600. As such, method 700 may be performed by clustering module 146 in some embodiments.

Partitioning method 700 begins in 710 by choosing a reference user 800 (see FIG. 8) from the group of users. In various embodiments, the reference user may be chosen at random or according to particular heuristics.

In 720, the method comprises calculating the centroid of attributes for users in the group. The centroid may correspond to an average set of attributes among the users in the group. For instance, if the average value for a given attribute among members of the group is 3, then the centroid includes the value 3 for that attribute. In various embodiments, the "average" may correspond without limitation to various collective mathematical measures, such as an arithmetic mean, geometric mean, median, weighted average, or other representations. In some embodiments, users who have no value for a given attribute may be omitted when calculating the centroid. The centroid may include any number of attributes, according to the attributes shared by the group.

Figure 8:
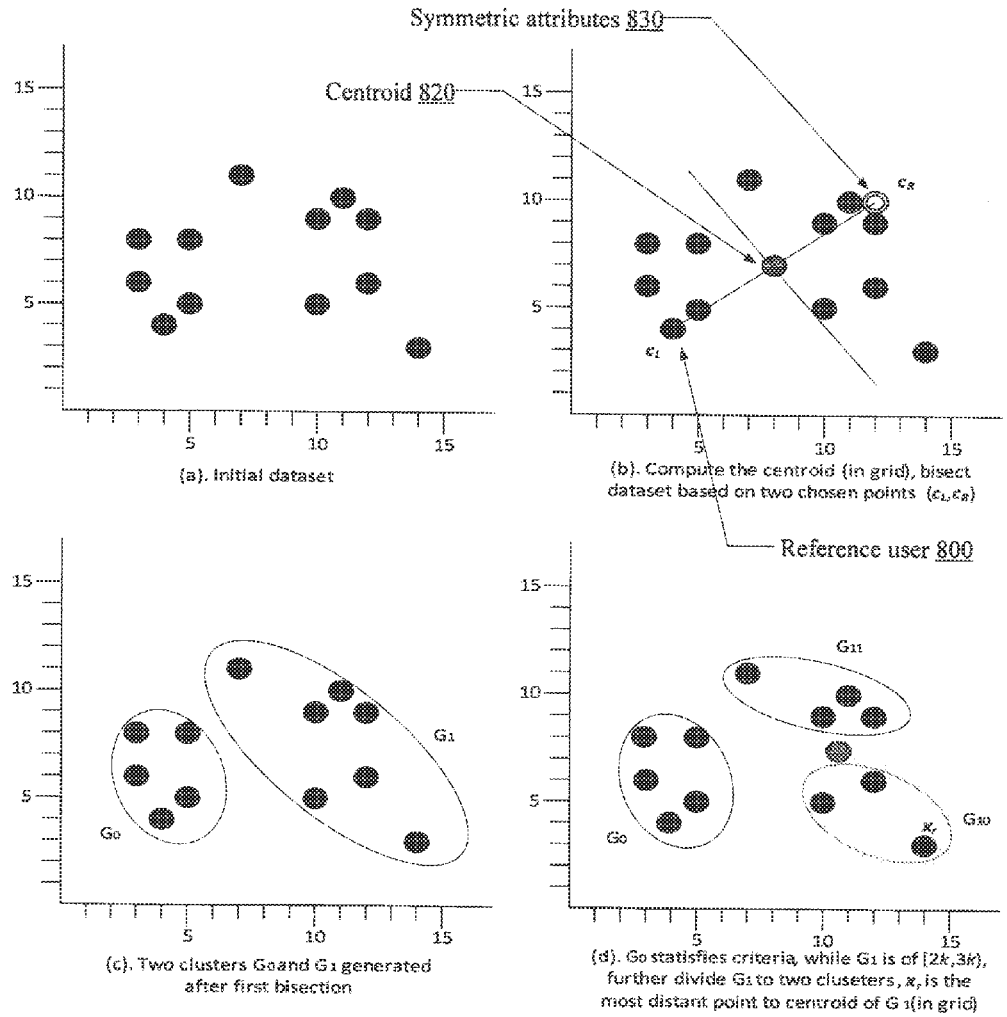
FIG. 8 is a graphical visualization of partitioning a group of users into subgroups.

In 730, the method comprises determining a symmetric set of attributes based on the reference user's attributes and the centroid attributes. Geometrically, the "symmetric" set of attributes corresponds to the reflection of the reference user about the centroid, as shown in FIG. 8. Consider a simplistic example where each user has only two attributes. If the reference user attributes are (4, 4) and the centroid attributes are (6, 6), then the symmetric set of attributes would be (8, 8).

In 740, the method comprises calculating a potential partitioning by assigning each user in the group to either a first subgroup or to a second subgroup, depending on whether the user's attributes are closer to those of the reference user or to those of the symmetric set of attributes. Thus, step 740 results in a partitioning of the group into two subgroups, where the users in each subgroup are similar to the other users in the subgroup.

In some embodiments, the method may comprise generating several potential partitionings and choose the best one. For example, in method 700, the method may repeat steps 710-740, as indicated by the feedback loop from 750 to 710, until some termination condition occurs. In various embodiments, the termination condition may vary. For example, in some embodiments, the method may comprise generating a set number of potential partitionings. In other embodiments, the method may continue generating partitionings until finding one that meets as given maximum error within a set number of maximum tries.

When enough possible partitionings have been generated, as indicated by the negative exit from 750, the method may comprise choosing the potential partitioning with lowest error. The error of a partitioning refers to the degree of dissimilarity between members of a proposed group. For example, the error of a group may be measured by a standard deviation from the group centroid or using any other mathematical measure (e.g., sum of squares error). The result of method 700 is therefore a partitioning of a given group into two separate groups of similar users, as recited in step 615 of method 600.

FIG. 8 is a graphical visualization of partitioning a group of users into two subgroups, such as by performing method 700. In (a), a group of users are represented by solid circles on a two-dimensional plot. The x and y coordinates on the two-dimensional plot may represent respective attribute values for each user.

In (b), reference user 800 is chosen (as in 710), centroid 820 is calculated (as in 720), and a symmetric set of attributes 830 is calculated (as in 730) based on reference user 800 and centroid 820. The space is then partitioned into area that is closer to the reference user and another area that is closer to the symmetric attributes. The space partitioning is shown by the bisecting line between reference user 800 and symmetric attributes 830.

As shown in (c), the users are partitioned into two groups, according to the partitioned space shown in (b). The partitioning may be repeated for any group that is too large, as in method 600. For example, group $G_1$ in (c) is partitioned into two more groups, as shown in (d), by repeating the partitioning method (i.e., picking a new reference user from the group, calculating a new centroid for the group, and determining a symmetric set of preference).

As discussed above, method 600 may be used to identify clusters of similar users where each one requires a fixed level of anonymity (i.e., fixed k-gather). However, in some embodiments, different users may prefer different levels of privacy. For example, some users may not require any privacy while others may require some arbitrary amount (i.e., k may vary for different users). The problem of finding a clustering with such constraints may be referred to as a "variable k-gather problem."

Feature Extraction

The result of the clustering phase described above is a set of user clusters, where each cluster contains user(s) with similar transformed attributes. For each cluster of users, the system may refer back to dataset 200 and anonymize the rating of each movie (e.g., as the average rating over users who have rated the movie). This process is referred to herein as feature extraction.

FIG. 9 is a flow diagram illustrating a method for performing feature extraction, according to some embodiments. The feature extraction method may correspond to step 430 of FIG. 4 and may therefore be performed by feature extractor 148 of FIG. 3.

According to the illustrated embodiment, feature extraction method iterates over every cluster and anonymizes that cluster. To anonymize a cluster, the method comprises iterating over each attribute and, in 910, calculating an anonymous value for that attribute for the cluster of users. For example, the anonymous value may be an average value for that attribute among all users in the cluster. In various embodiments, any other collective mathematical measure may be used to reflect that values of that attribute across users in the cluster. In some embodiments, users who are not associated with a value for a given attribute may be ignored when calculating the collective measure (e.g., average) in 910.

In 920, the method iterates over each user in the cluster and replaces the user's personal value for the attribute with the collective "anonymous" value. In some embodiments, if a user did not previously have a value for the given attribute, the anonymous value may still be inserted so as to preserve anonymity.

This is illustrated in FIG. 10. FIG. 10 shows a dataset 1001 prior to feature extraction and a dataset 1002 that is an example anonymous version of dataset set 1001. In the example shown, users 1 and 3 were determined to be members of the same cluster and user 2 and 4 were determined to be members of the same cluster. As may be inferred from the example attribute values shown in dataset 1001, attribute B was given a greater weight that attribute A, thus resulting in a cluster containing users 1 and 3 and another cluster containing users 2 and 4, even though user 1's attribute value for attribute A is more similar to users 2 and 4's attribute value for attribute A than to user 3's attribute value for attribute A. In the anonymous version of dataset 1001 (i.e. dataset 1002), the attribute values for users 1 and 3 are the same and the attribute values for users 2 and 4 are the same. In this example, the attribute values in dataset 1002 are the average values of the corresponding attribute values from dataset 1001. Because of the redundancy of some of the data in dataset 1002, the publisher of dataset 1002 need not publish all of the data in dataset 1002, but may choose to publish the non-duplicative data.

Of course, there exist alternative ways to anonymize a dataset once the clusters are determined. For example, instead of each entity in a given cluster having the same attribute values as each other entity in the cluster (i.e., the common value approach), one may randomly generate values with a certain distribution. For example consider users 1 and 3 from FIG. 10 and consider attribute A. To anonymize users 1 and 3 we can replace the attribute values for these users for attribute A with a randomly generated number in the range of [2,4].

Figure 11:
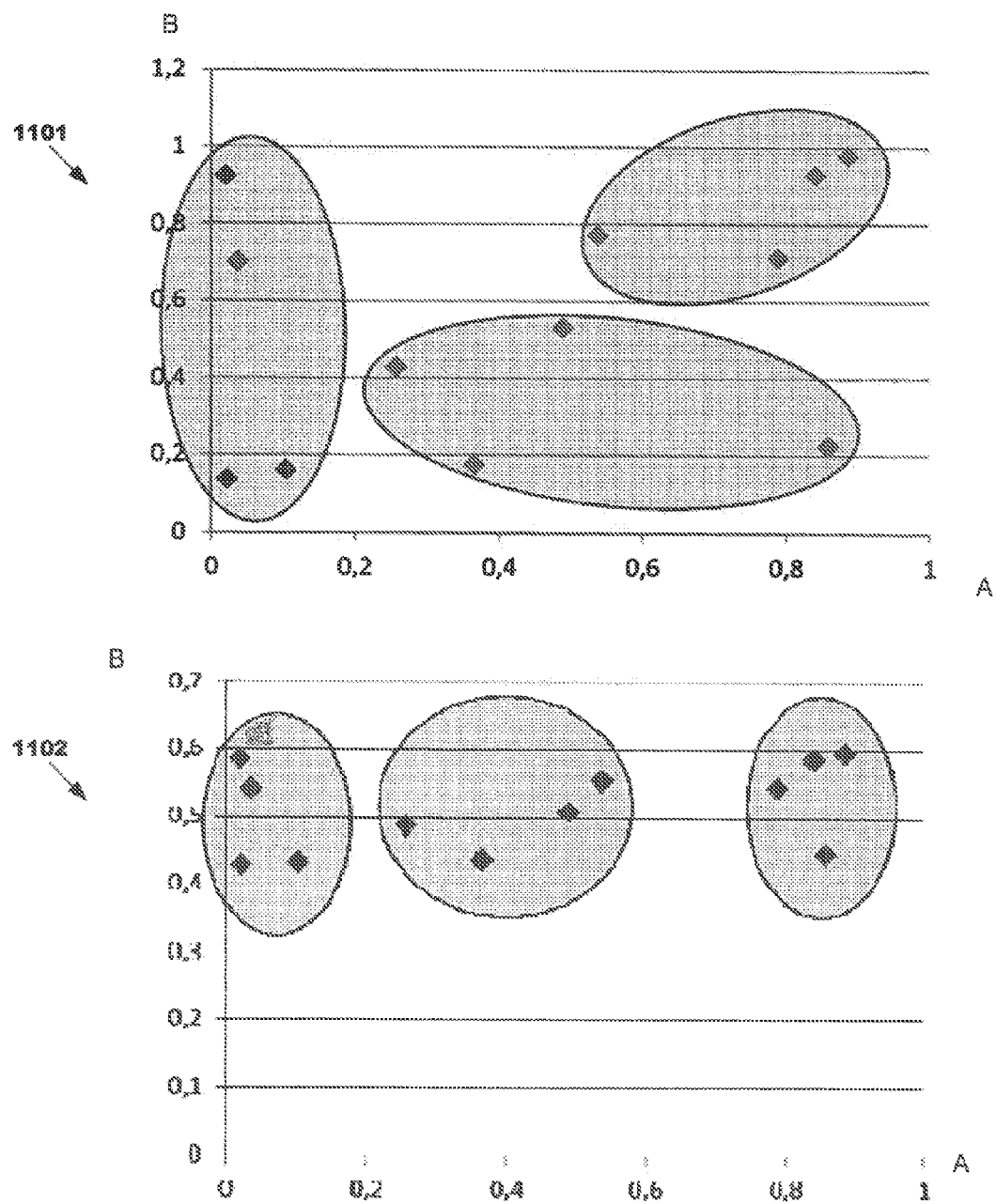
FIG. 11 is a graphical visualization comparing transformed data with untransformed data.
Figure 12:
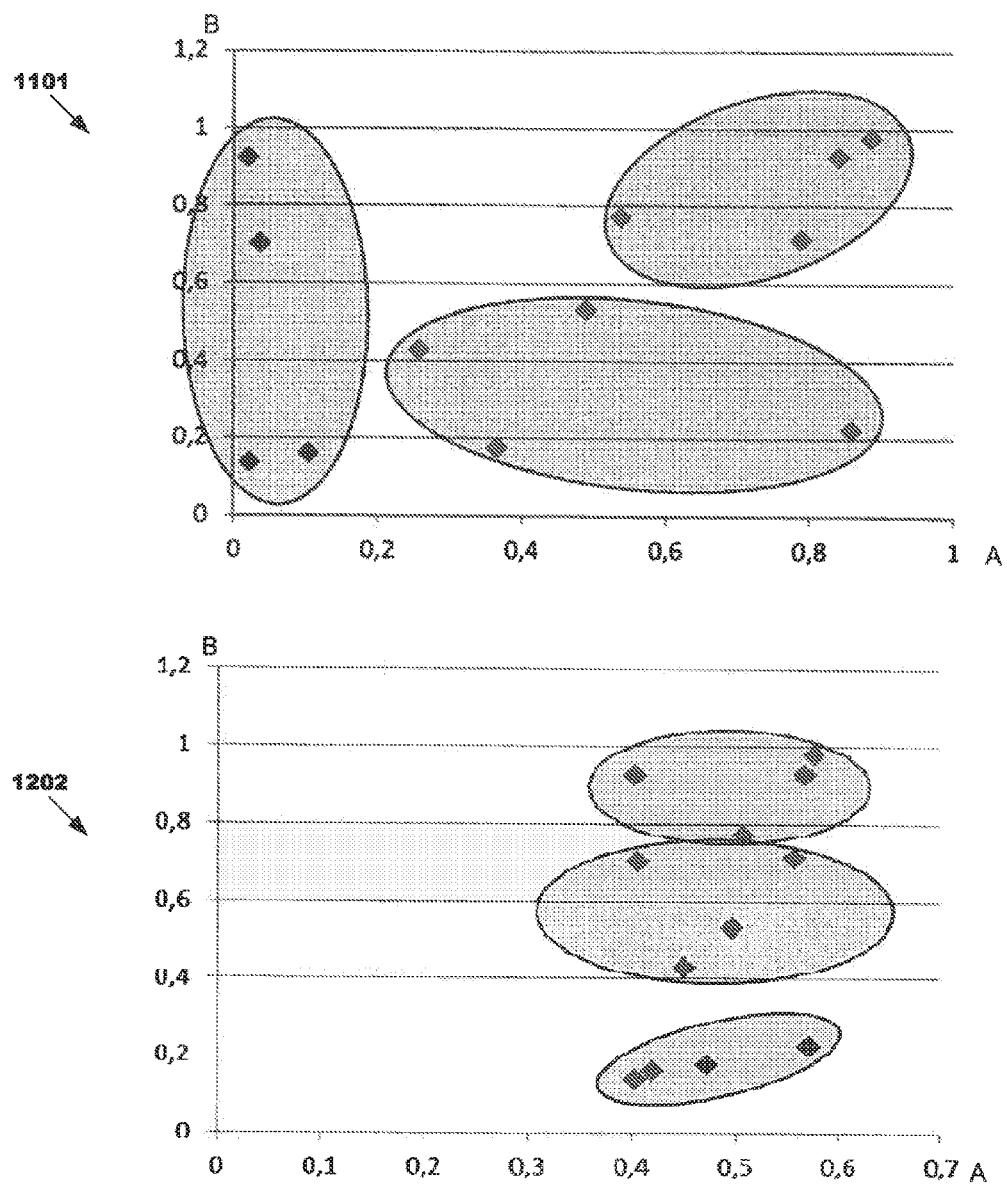
FIG. 12 is a graphical visualization also comparing transformed data with untransformed data.

FIGS. 11 and 12 illustrate that the resulting of the clustering step may depend on whether transformed or untransformed attribute values are used when performing the clustering. That is, FIGS. 11 and 12 illustrate the affect that the weight vector can have on the outcome of the clustering step. FIGS. 11 and 12 assume that for each entity there exists only two attribute values, one value for a first attribute (attribute A; e.g., age) and one value for a second attribute (attribute B; e.g., income) FIG. 11 shows a first data plot 1101 using un-transformed, but normalized attribute values. Each dot in plot 1101 represents an entity and the X and Y axis correspond to attribute A and attribute B, respectively. The location of an entity in plot 1101 depends on the entity's attribute values for attributes A and B. FIG. 11 also shows a second data plot 1102 using transformed normalized attribute values. Each dot in plot 1102 represents one of the entities from plot 1101. The location of an entity in plot 1102 depends not only on the entity's attribute values for attributes A and B, but also on the weight for attribute A and the weight for attribute B. In the example shown in plot 1102, the weight for attribute A (e.g, age) is greater than the weight for attribute B (e.g., income), thus, differences in income will mean less than differences in ages when performing the clustering on the transformed data set. This is illustrated in FIG. 11 as the clusters that are formed using the untransformed data (see plot 1101) are different than the clusters that are formed using the transformed data (see plot 1102).

Similarly, FIG. 12 shows data plot 1101 and also shows a second data plot 1202 using transformed normalized attribute values. Each dot in plot 1202 represents one of the entities from plot 1101. The location of an entity in plot 1202 depends not only on the entity's attribute values for attributes A and B, but also on the weight for attribute A and the weight for attribute B. In this example, the weight for attribute A (e.g, age) is less than the weight for attribute B (e.g., income), thus, differences in age will have less of an impact than differences in income when performing the clustering on the transformed data set. This is illustrated in FIG. 12 as the clusters that are formed using the untransformed data (see plot 1101) are different than the clusters that are formed using the transformed data (see plot 1202). As can also be seen, the clusters that are formed when A is weighted more than B are different than the clusters that are formed when A is weighted less than B.

A great advantage of these embodiments is that they provide greater customization of the anonymous dataset. For example, some data mining processor may care more about the ages of the users, whereas other data mining processor may care more about the incomes of the users. With the embodiments disclosed, multiple anonymous datasets can be created where each dataset is tailored to the preference of the end user of the anonymous dataset.

Example Systems

Figure 13:
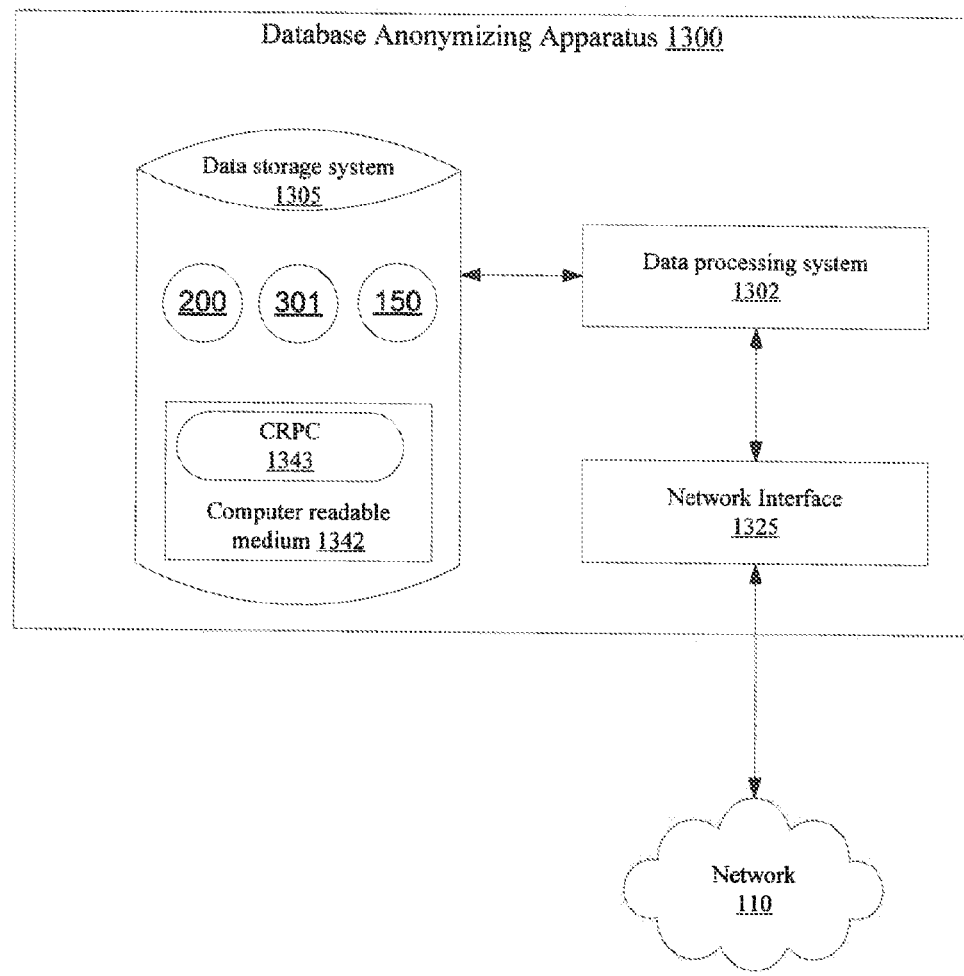
FIG. 13 illustrates a possible implementation for at least some components of a database anonymizing apparatus, according to some embodiments.

FIG. 13 illustrates a possible implementation for at least some components of a database anonymizing apparatus 1300, according to some embodiments. As shown in FIG. 13, database anonymizing apparatus 1300 may include: a data processing system 1302, which may include one or more data processing devices each having one or more microprocessors and/or one or more circuits, such as an application specific integrated circuit (ASIC), Field-programmable gate arrays (FPGAs), etc; a network interface 1325 for receiving messages and transmitting messages; a data storage system 1305, which may include one or more computer-readable mediums, such as non-volatile storage devices and/or volatile storage devices (e.g., random access memory (RAM)). As shown in FIG. 13, data storage system 1305 may be used to store datasets 200, 301, and 150 as well as preference information 300, and/or various other data.

In embodiments where data processing system 1302 includes a microprocessor, a database anonymizing computer program product is provided, which includes computer readable program code 1343. Program code 1343 may implement a computer program, which may be stored on a computer readable medium 1342. Storage medium 1342 may include, but is not limited to, magnetic media (e.g., a hard disk), optical media (e.g., a DVD), memory devices (e.g., random access memory), etc. In some embodiments, computer readable program code 1343 may be configured such that, when executed by data processing system 1302, code 1343 causes the processing system to perform steps described above (e.g., steps describe above with reference to the flow charts shown in FIGS. 4-7).

In some embodiments, database anonymizing apparatus 1300 may be configured to perform steps described above without the need for code 1343. For example, data processing system 1302 may include specialized hardware, such as one or more application-specific integrated circuits (ASICs). Hence, the features of the present invention described above may be implemented in hardware and/or software. For example, in some embodiments, the functional components of the database anonymizing system described above may be implemented by data processing system 1302 executing computer instructions 1343, by data processing system 1302 operating independent of any computer instructions 1343, or by any suitable combination of hardware and/or software.

Figure 14:
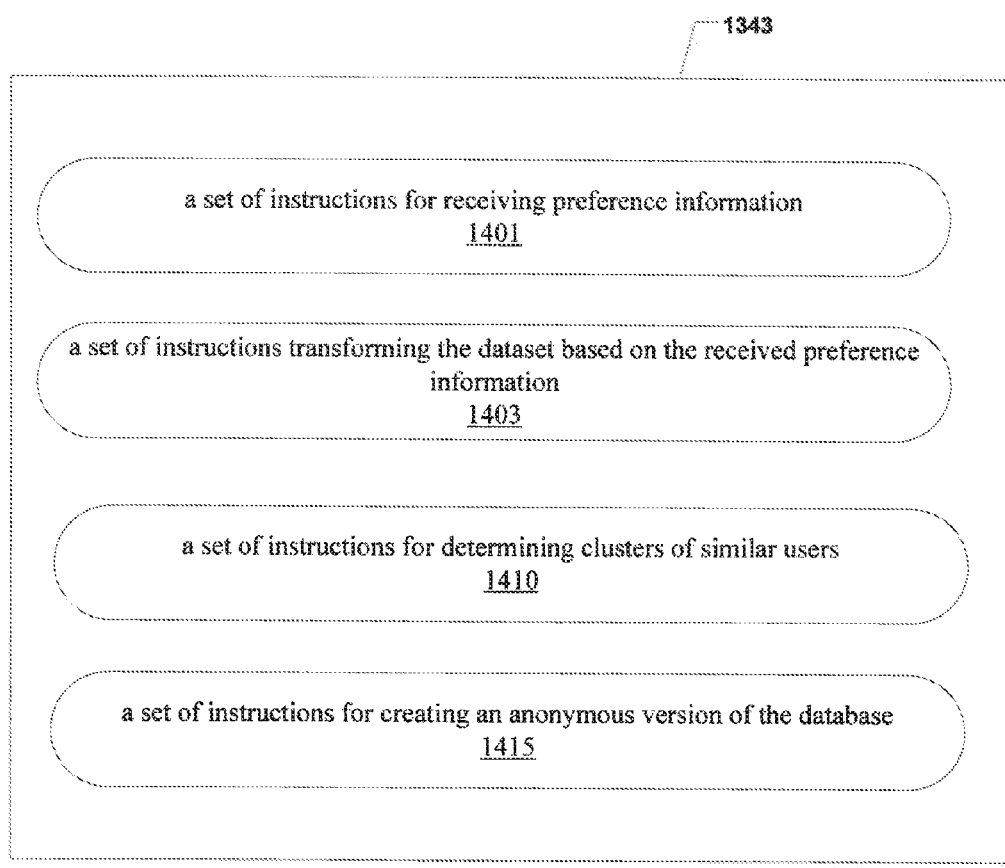
FIG. 14 illustrates an embodiment of a computer readable program code.

FIG. 14 illustrates an embodiment of a computer readable program code (CRPC) 1343. In the embodiment shown, CRPC 1343 includes (1) a set of instructions 1405 for pre-processing a sparse data set to reduce dimensionality and/or sparseness, as described here, (2) a set of instructions 1410 for determining clusters of users (e.g., to solve the fixed or variable k-gather problem) as described herein, and (3) a set of instructions 1415 for extracting features from each cluster, as described herein.

Though various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A computerized method for anonymizing a dataset that associates each entity included in a set of entities with a set of two or more attribute values, wherein each said attribute value associated with the entity is associated with a different entity attribute, the method being performed by a computer system and comprising:

receiving preference information that comprises a set of attribute weights, wherein each attribute weight included in the set is associated with one of the entity attributes;

for each entity included in the set of entities, transforming said set of two or more attribute values associated with the entity using the preference information, thereby creating for the entity a set of two or more transformed attribute values, wherein the transforming the set of two or more attribute values comprises:

normalizing the set of two or more attribute values to produce normalized attribute values, and after normalizing the set of two or more attribute values to produce normalized attribute values, calculating, for each of the normalized attribute values, a transformed attribute value using the normalized attribute value and the attribute weight associated with the entity attribute with which the normalized attribute value is associated;

clustering the entities included in the set of entities using said transfoinied attribute values to form at least a first entity cluster consisting of a first subset of the entities and a second entity cluster consisting of a second subset of the entities, wherein no entity included in the first entity cluster is included in the second entity cluster;

anonymizing the first subset of entities; and anonymizing the second subset of entities.

2. The method of claim 1, wherein the step of calculating the transformed value comprises multiplying the weight with a value that is equal to the normalized value minus a first value and adding the result of the multiplication with the first value.

3. The method of claim 2, wherein the first value is the mean of a set of values.

4. The method of claim 1, wherein the step of anonymizing the first subset of entities comprises creating a first new anonymous dataset that: (1) associates a first common attribute value with each entity included the first subset, the first common attribute value being associated with a first entity attribute and (2) associates a second common attribute value with each entity included the first subset, the second common attribute value being associated with a second entity attribute that is different than the first entity attribute, and the step of anonymizing the second subset of entities comprises creating a second new anonymous dataset that: (1) associates a third common attribute value with each entity included the second subset, the third common attribute value being associated with the first entity attribute and (2) associates a fourth common attribute value with each entity included the second subset, the fourth common attribute value being associated with the second entity attribute.

5. The method of claim 4, further comprising publishing the first and second new anonymous datasets.

6. The method of claim 1, wherein the step of clustering the entities comprises:

creating an intermediate dataset using the transformed attribute values and processing the intermediate dataset to create an unsparse dataset that is less sparse than the intermediate dataset; and identifying entity clusters using the unsparse dataset.

7. The computerized method of claim 1, wherein the transformed value for an $i^{th}$ entity and $j^{th}$ attribute ($tv_{ij}$) is calculated as $tv_{ij}=mv_j+(nv_{ij}-mv_j) \times W_j$, wherein $mv_j$ is the mean value of a set of values for the $j^{th}$ attribute, $nv_{ij}$ is a normalized value for the $i^{th}$ entity and $j^{th}$ attribute, and $W_j$ is a weight value for the $j^{th}$ attribute.

8. The computerized method of claim 1, wherein clustering the entities comprises partitioning the entities in the set of entities into clusters each having entities with similar transformed attribute values.

9. The computerized method of claim 8, wherein clustering the entities comprises:

calculating a centroid of the transformed attribute values of the entities in the set of entities; and partitioning the set of entities into two clusters that are symmetric to each other with respect to the centroid.

10. The computerized method of claim 1, wherein one of the entity attributes is user income and another one of the entity attributes is age.

11. A database anonymizing apparatus, comprising a data processing system; and a data storage system, wherein the data storage system stores a dataset that associates each entity included in a set of entities with a set of two or more attribute values, wherein each said attribute value associated with the entity is associated with a different entity attribute, the data storage system comprises a computer readable medium storing computer readable program code (CRPC), and the CRPC comprises:

instructions for, for each entity included in the set of entities, transforming said set of two or more attribute values associated with the entity using received preference information, thereby creating for the entity a set of two or more transformed attribute values, wherein the preference information comprises a set of attribute weights, wherein each attribute weight included in the set is associated with one of the entity attributes, and wherein the instructions for transforming the set of two or more attribute values include instructions for:

normalizing the set of two or more attribute values to produce normalized attribute values, and after normalizing the set of two or more attribute values to produce normalized attribute values, calculating, for each of the normalized attribute values, a transformed attribute value using the normalized attribute value and the attribute weight associated with the entity attribute with which the normalized attribute value is associated;

instructions for clustering the entities included in the set of entities using said transformed attribute values to form at least a first entity cluster consisting of a first subset of the entities and a second entity cluster consisting of a second subset of the entities, wherein no entity included in the first entity cluster is included in the second entity cluster;

instructions for anonymizing the first subset of entities; and instructions for anonymizing the second subset of entities.

12. The database anonymizing apparatus of claim 11, wherein the instructions for calculating the transformed value comprises instructions for multiplying the weight with a value that is equal to the normalized value minus a first value and instructions for adding the result of the multiplication with the first value.

13. The database anonymizing apparatus of claim 12, wherein the first value is the mean of a set of values.

14. The database anonymizing apparatus of claim 11, wherein the instructions for anonymizing the first subset of entities comprises instructions for creating a first new anonymous dataset that: (1) associates a first common attribute value with each entity included the first subset, the first common attribute value being associated with a first entity attribute and (2) associates a second common attribute value with each entity included the first subset, the second common attribute value being associated with a second entity attribute that is different than the first entity attribute, and the instructions for anonymizing the second subset of entities comprises instructions for creating a second new anonymous dataset that: (1) associates a third common attribute value with each entity included the second subset, the third common attribute value being associated with the first entity attribute and (2) associates a fourth common attribute value with each entity included the second subset, the fourth common attribute value being associated with the second entity attribute.

15. The database anonymizing apparatus of claim 14, wherein the CRPC further comprises instructions for publishing the first and second new anonymous datasets.

16. The database anonymizing apparatus of claim 11, wherein the instructions for clustering the entities comprises:
   instructions for creating an intermediate dataset using the transformed attribute values and processing the intermediate dataset to create an unsparse dataset that is less sparse than the intermediate dataset; and
   instructions for identifying entity clusters using the unsparse dataset.

* * * * *